Nov. 11, 1947.  L. B. GREEN  2,430,813
BAND SHRINKER
Filed Jan. 24, 1946  2 Sheets-Sheet 1

INVENTOR.
BY LEE B. GREEN
Kwis, Hudson, Boughton & Williams
ATTORNEYS

Nov. 11, 1947.  L. B. GREEN  2,430,813
BAND SHRINKER
Filed Jan. 24, 1946  2 Sheets-Sheet 2

INVENTOR.
LEE B. GREEN
BY
Kwis Hudson Boughton & Williams
ATTORNEYS

Patented Nov. 11, 1947

2,430,813

UNITED STATES PATENT OFFICE 2,430,813

BAND SHRINKER

Lee B. Green, Lakewood, Ohio

Application January 24, 1946, Serial No. 643,128

2 Claims. (Cl. 78—15)

This invention relates to machines for operating on annular metal bodies such as tire rims and, as one of its objects, aims to provide an improved construction for a machine of this type.

As is understood by those skilled in this art it is frequently desirable to subject tire rims or other annular metal bodies to very heavy radial forces or pressures, through appropriate dies, for contracting or expanding such work pieces or for accomplishing punching or forming operations thereon. As another of its objects, the present invention provides an improved construction by which these heavy forces can be quickly and directly applied to an expandible and contractible sectional die-actuating means.

A further object of this invention is to provide an improved machine of the character mentioned in which the use of toggle type thrust links in conjunction with an arcuately movable actuating ring permits the heavy forces to be applied at a distinct mechanical advantage.

Still another object of the invention is to provide improved apparatus of this character in which the thrust links are movable toward and from a substantially radial position and stop means for the actuating ring limits its arcuate movement in attaining such radial position for the links.

It is also an object of this invention to provide an improved apparatus of the character referred to in which the actuating ring is positioned for its arcuate movement in the frame of the machine by a novel arrangement of cooperating roller and arcuate bearing elements and wherein provision is made for adjustment of the bearing elements.

The invention can be further briefly summarized as consisting in certain novel combinations and arrangements hereinafter described and particularly set out in the appended claims.

Figure 1:
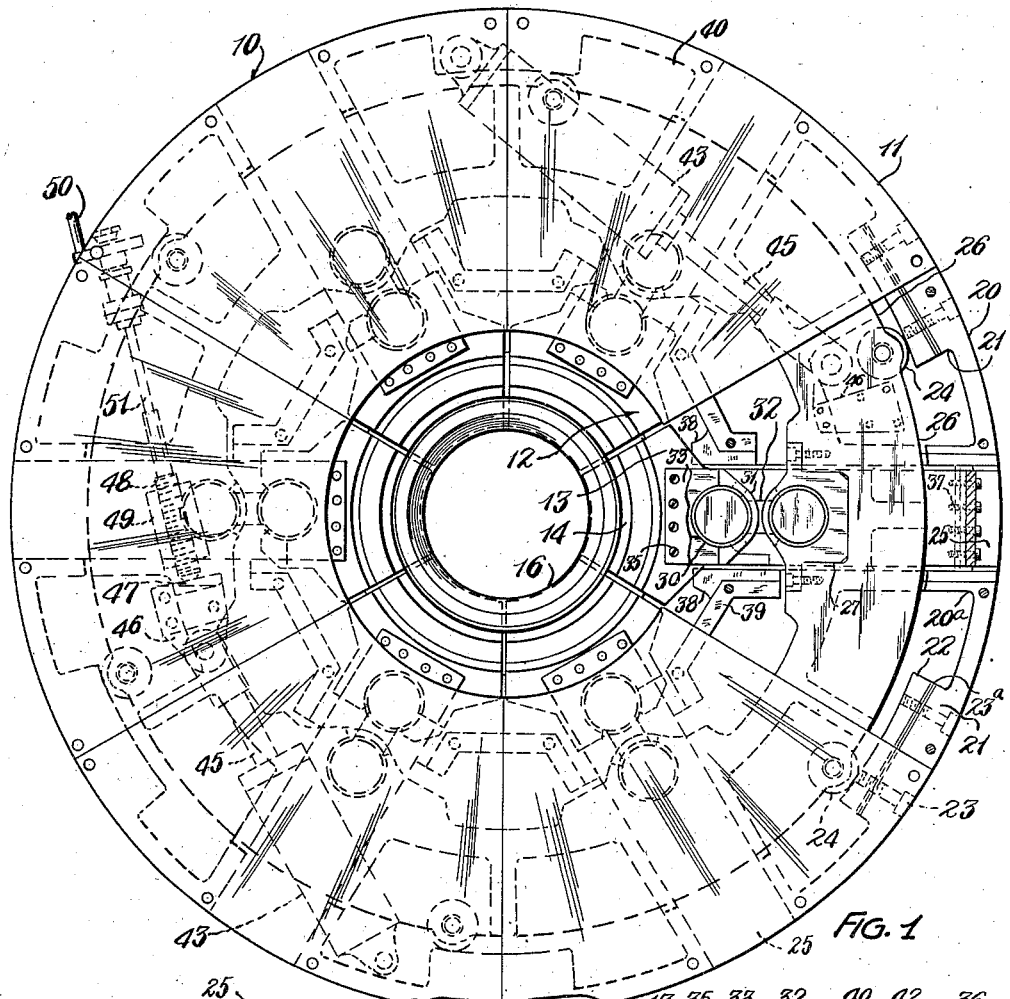
Fig. 1 is a plan view of a work-forming machine embodying the present invention, the machine being shown with one of the cover sections removed.

Before proceeding with the detailed description of the particular form of my machine shown in the drawings, I desire it to be understood that the invention is susceptible of various changes and modifications. Likewise it should be understood that, although the machine is especially suitable for operating on annular bodies such as tire rims and is at times referred to as a band "setter" or "shrinker," it is not limited to this particular service but can be applied to various other bodies and uses. For example, by the use of suitable dies the apparatus can readily be adapted to punching, shaping or expansion of annular metal bodies.

Figure 2:
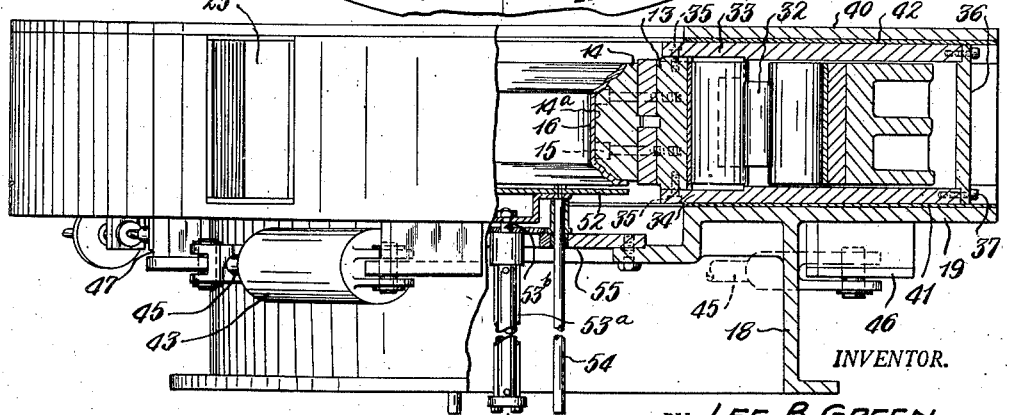
Fig. 2 is a side view showing the machine partly in elevation and partly in section.
Figure 3:
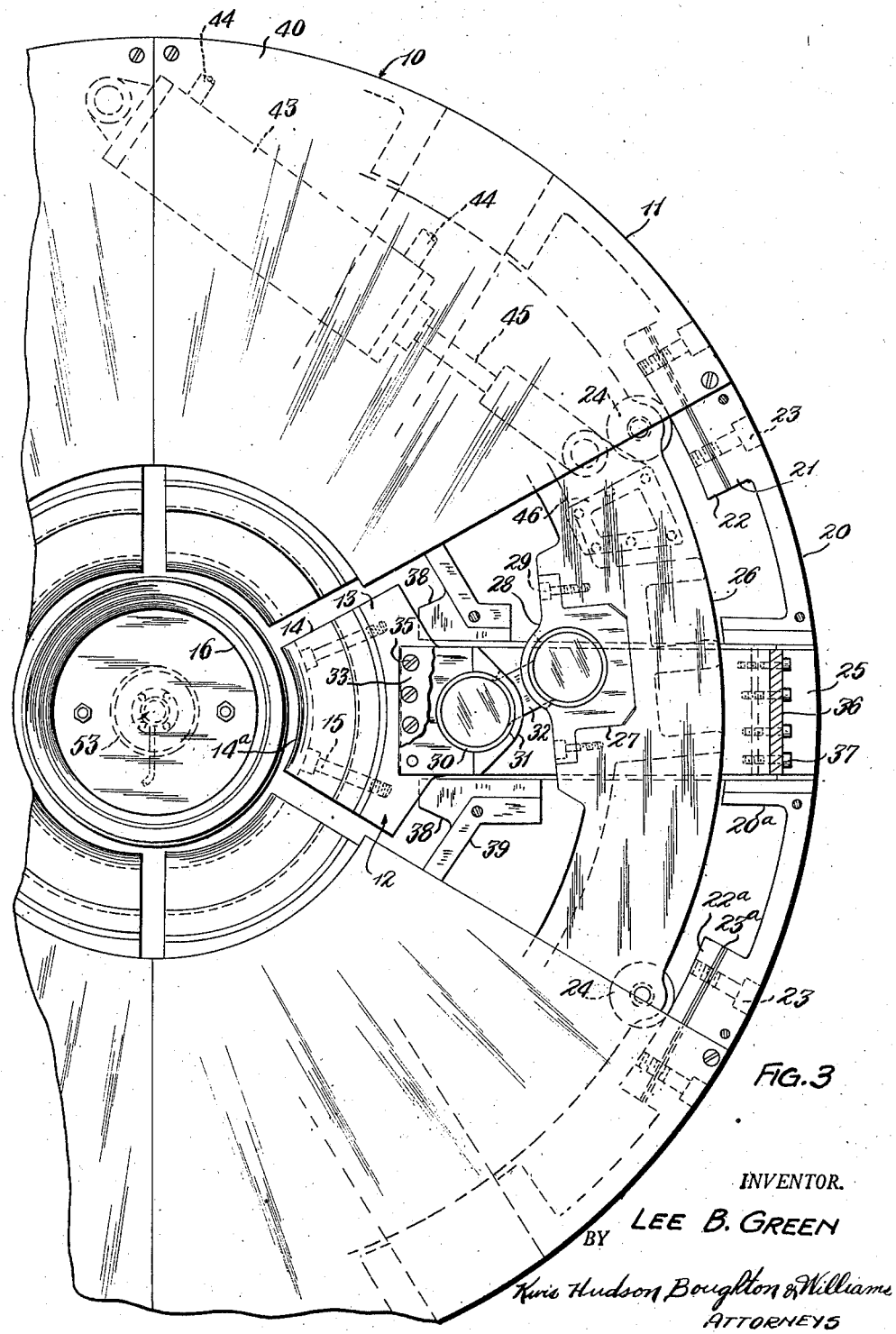
Fig. 3 is a partial plan view similar to Fig. 1 but showing the position of the parts when the die-actuating members are in a retracted position.

In the drawings I show the machine 10 as having a substantially ring-shaped frame 11 and an annular work-shaping means 12 located within the frame. The work-shaping or die-actuating means 12 comprises a plurality of complementary members or segments 13 (Fig. 3) which are movable along substantially radial paths from a closed position as shown in Figs. 1 and 2 to an open or retracted position as shown in Fig. 3. The work-shaping means is here shown as cooperating with or including a die comprising complementary sections or segments 14 which are detachably connected, respectively, with the radially movable members 13, as by means of screws 15. The die segments 14 have work-engaging faces 14a (Fig. 2) of a shape or contour corresponding with that of the work piece to be engaged which, in this instance, is a tire rim 16.

The ring-shaped frame 11 comprises a depending base or standard 18 (Fig. 2), upon which the machine rests, and is also provided with a laterally extending annular flange 19 and an upright ring-shaped flange 20. At annularly spaced points about the flange 20 are formed internal lugs or projections 21 to which are attached bearing elements preferably in the form of plates 22 (of wear-resistant material) by means of screws 23. The inner surfaces 22a of the bearing plates 22 are arcuate in shape, being substantially concentric with flange 20, and provide a bearing surface or runway for rollers 24 to be described later. Suitable shims 23a may be placed between bearing plates 22 and lugs 21 to secure accurate alignment of the bearing surfaces and to permit a radial adjustment of the plates to compensate for wear. Between each pair of spaced lugs 21, the flange 20 is provided with radial openings 25 the sides of which are defined by spaced, parallel, inwardly directed extensions 20a of the flange 20. The purpose of these openings and flanges 20a will appear as the description proceeds.

The actuating means for the work-shaping members 13, and the die segments 14 carried thereby, includes a member which is movable substantially transversely of the radial paths of movement of the members 13 and which, in this instance, is shown as a ring 26. The ring is arcuately or circumferentially movable within the flange 20 of frame 11 and is guided in this movement by the rollers 24 (mounted on ring 26) which run upon the bearing plates 22 carried by the flange 20. For utilizing the arcuate movement of the ring 26 so as to cause actuation of the work-shaping members or segments 13 with the desired mechanical advantage I provide a toggle type connection therebetween.

For this purpose, the ring 26 has annularly spaced recesses 27 on the inner face thereof in which bearing members 28 are seated and are retained therein by means of screws 29, there being the same number of bearing members 28 as there are work-shaping members 13. The outer ends of the work-shaping members 13 are each provided with a semi-circular bearing recess 30, the other half of the bearing recess being formed in a cap member 31 secured by means (not shown) to the outer end of each of the work-shaping members 13. Each pair of bearings thus formed in the work-shaping members and the ring member 26 accommodate the enlarged ends of a toggle link 32 for limited swinging movement. Suitable bearing material is interposed between the enlarged ends of links 32 and the bearing recesses in members 13, 28 and 31. This bearing material may consist of sleeve bearings, babbitting or other conventional means. The bearing members 28 and bearing caps 31 are suitably slotted to accommodate the straight portions of links 32.

In the arrangement just described, it will be seen that links 32 constitute thrust members for forcing the work-shaping members 13 (and the dies 14 carried thereby) into engagement with the annular work piece 16 and to exert considerable force thereon. Thus, as ring 26 is arcuately shifted or rotated in a clockwise direction the links 32 are straightened from the inclined position shown in Fig. 3 to the radial or substantially radial position illustrated in Fig. 1. This produces radial movement of the work-shaping members which are guided to move in a straight line by means to be described hereafter. As is well-known, this straightening of the links 32 affords a high mechanical advantage which is important in an apparatus of the nature disclosed. Arcuate movement of ring 26 in the reverse direction moves links 32 from the position shown in Fig. 1 to that illustrated in Fig. 3, thus positively retracting the work-shaping members 13 to allow the replacement of the work 16 with a new piece to be operated upon.

As previously mentioned, the work-shaping members 13 are guided for radial movement in a straight line. This is effected by means of upper and lower arms or guide plates 33 and 34 (Fig. 2) which are attached at their inner ends to the top and bottom, respectively, of work-shaping members 13 by means of screws 35. The plates 33 and 34 extend above and below the links 32 and the ring 26, as shown in Fig. 2, with a suitable clearance and are connected at their outer ends to a vertical plate 36 by means of screws 37. Guide members 38, attached to the vertical webs or flanges 39 of the frame 11, provide a radial guideway for the inner ends of plates 33 and 34 which have a sliding fit therein. The outer ends of plates 33 and 34 have a sliding fit between the parallel sides 20a of the radial openings 25 in flange 20. The flanges 20a (forming the sides of the openings 25) and the guides 38 may be provided with suitable wear-resisting surfaces by any known means.

The top portion of the frame 11 is preferably closed by a series of annular groups of segmental cover plates 40 which are suitably connected to the body of the frame 11 and form a cover extending over the work-shaping members 13 and plates 33 so as to prevent the entry of foreign matter into the mechanism. One of these plates is shown removed in Figs. 1 and 3 to reveal the underlying mechanism. The cover plates 40 also perform the function of top guiding means for the sliding plates 33. A sliding surface 41 for sliding plates 34 is provided on the horizontal flange 19 of the frame 11 and a similar surface 42 is provided for plates 33 on the underside of cover plates 40. These surfaces 41 and 42 may comprise removable plates or may be formed integrally on members 19 and 40, respectively.

The aforementioned actuation of the ring 26 may be obtained by any appropriate power means and, in this instance, I show a tangential power means for this purpose comprising a pair of cylinders 43 to which hydraulic or other motive fluid pressure is supplied. The cylinders 43 are preferably double-acting having fluid supply and exhaust connections 44 at opposite ends thereof and having reciprocable pistons (not shown) therein to which piston rods 45 are connected. The piston rods 45 are pivotally connected with ring 26 as by means of brackets 46 which depend from ring 26 through suitable openings in flange 19 of frame 11. The cylinders 43 are suitably mounted on the frame 11 and are located so that the actuating force supplied by the pistons thereof will be applied to the ring 26 substantially tangentially thereof.

Stop means are provided, as an important part of the present invention, in order that the thrust links 32 will not overthrow when actuated to their straightened or radial position (Fig. 1). This stop means comprises an abutment lug 47 on the lower side of ring 26 which lug may be formed integrally with one of the brackets 46. The stop means further comprises a screw member 48 threaded in a lug or nut 49 formed integral with, or connected to, the lower side of frame 11. When ring 26 is actuated in a clockwise direction lug 47 will strike the rounded end of screw member 48 when the links 32 are in their straightened or substantially radial position. In order to initially adjust the stop means and to provide for subsequent adjustment when necessary, screw 48 may be screwed inwardly or outwardly through lug 49 by means of crank 50. Crank 50 is mounted upon a shaft 51 which is suitably journalled for rotation on the lower side of frame 11. The end of shaft 51 extends into an opening in the end of screw 48 and has a splined connection therewith.

The annular work piece 16 is supported in the desired position in the die by any suitable means or work holder. In the illustrated embodiment this work support comprises a plate 52 which is connected with an elevating means indicated generally at 53. One or more rods 54, attached to plate 52, extend through guide openings in a plate or ring 55, which is connected with a projection on flange 19, for guiding the work support and preventing rotation thereof when being raised and lowered. The elevating means 53 is here shown as being a double acting fluid pressure cylinder 53a having a piston therein which is connected with the plate 52 by the piston rod 53b.

The operation of the device may be briefly summarized as follows: With the work-shaping members 13 and die segments 14 in the open or retracted position, as shown in Fig. 3, the work support 52 is elevated by operation of the elevating means 53. The work piece 16, in this case a wheel rim, is placed upon the work support 52 and the elevating means 53 is operated to lower the work to the working position shown in Fig. 2. Thereupon fluid pressure is supplied to cylinders 43 operating the piston rods 45 and thereby rotating ring 26 in a clockwise direction until lug 47 strikes against stop screw 48. As ring 26 is so rotated the links 32 will be moved from their position as shown in Fig. 3 to the position shown in Fig. 1. This straightenng of the links moves the work-shaping members and die segments radially inwardly to engage the work 16 and perform the desired operation thereon. As previously mentioned the toggle nature of the links 32 affords a high mechanical advantage and enables a large force to be exerted by the die member as the said toggle links approach the radial positions illustrated in Fig. 1. The apparatus may remain in this operated position for any desired length of time depending upon the amount of "set" it is desired to impart to the work 16. Thereafter counterclockwise rotation of ring 26, by the application of fluid pressure to the cylinders 43, retracts the work-shaping members 13 and the die segments 14 to the position shown in Fig. 3 whereupon the work elevating means may be again operated to remove the member 16 from the device.

From the foregoing description and the accompanying drawing it will now be readily understood that this invention provides a novel form of machine by which heavy forces can be quickly and directly applied to various kinds of work pieces, and in which cooperating thrust elements of novel form and arrangement convert rotary into reciprocating motion in such a way as to obtain a high mechanical advantage.

While I have illustrated and described my novel machine in considerable detail it will be understood, of course, that I do not wish to be correspondingly limited but regard my invention as including all changes and modifications coming within the spirit of the invention and the scope of the appended claims.

Having thus described my invention, I claim:

1. In a machine of the character described, a frame having annularly spaced substantially radially extending guideways therein, an annular group of members operable in said guideways and constituting an expandible and contractible die-actuating means, an actuating ring disposed in substantially concentric relation around said die-actuating means and being arcuately movable, power means operably connected with said frame and ring for imparting the arcuate movement to the latter, thrust links disposed between said ring and the respective members of said die-actuating means, thrust rollers spaced annularly about said ring, arcuate thrust plates engaged by said rollers for positioning said ring in said frame and being spaced annularly of said frame so as to lie between the pairs of adjacent guideways, and means mounting said arcuate thrust plates on said frame so as to permit radial adjustment of the thrust plates.

2. In a machine of the character described, an annular frame having a central opening and annularly spaced guideways extending substantially radially outwardly from said opening, an annular group of members reciprocable in said guideways and constituting an expandable and contractible work-shaping means, an actuating ring arcuately movable in said frame and disposed substantially concentrically around said work-shaping means, cooperating roller and arcuate backing surface elements for positioning said ring in said frame for said arcuate movement and being spaced annularly to lie between the pairs of adjacent guideways, toggle links disposed between said ring and said members for causing actuation of the latter in response to said arcuate movement of the ring and being shiftable by the ring from an inclined position to a substantially radial position and vice versa, means pivotally connecting said links at one end thereof with said ring, means pivotally connecting the other ends of the links with said members, means for imparting said arcuate movement to the ring, and stop means for limiting said arcuate movement in the direction for shifting said links toward said radial position.

LEE B. GREEN.

REFERENCES CITED

The following references are of record in the file of this patent:

UNITED STATES PATENTS

| Number | Name | Date |
| --- | --- | --- |
| 758,195 | Schweinert et al. | Apr. 26, 1904 |
| 1,496,583 | Lukes | June 3, 1924 |
| 1,563,941 | Wichmann | Dec. 1, 1925 |